Sept. 25, 1962

H. M. ARNOLD 3,055,395

OSCILLATING CAM AND FOLLOWER ASSEMBLY FOR
PULLING VALVES OPEN

Filed May 31, 1960

INVENTOR.
HENRY M. ARNOLD

WITNESS

INVENTOR.
HENRY M. ARNOLD

INVENTOR.

HENRY M. ARNOLD

United States Patent Office 3,055,395
Patented Sept. 25, 1962

3,055,395
OSCILLATING CAM AND FOLLOWER ASSEMBLY FOR PULLING VALVES OPEN
Henry M. Arnold, 222 S. 5th St., Douglas, Wyo.
Filed May 31, 1960, Ser. No. 32,884
6 Claims. (Cl. 137—636.1)

This invention relates to special types of valves that must be pulled back, or away, from their seat or closed position in contrast to the usual type of valve which is raised up or pushed off its seat. In poppet-valves used in internal combustion engines and in most poppet-valve steam engines the hot gases must flow around the head of the valve. In my design of piston poppet-valve the valve is pulled back from its seat and the hot gases can enter and leave the cylinder directly, without flowing around the head of the valve.

Since the valve motion is reversed; and the valve is actuated by pulling on the stem or rod of the valve, I provide a specially constructed cam, follower, tappet plate and set of pull rods to achieve this end. Unlike camshaft operated valves; my oscillating cam, follower, and pull rods can give any amount of valve opening for any desired part of the piston stroke; commonly known as the "point of cut-off." Unlike my previously patented oscillating cams; my new construction is provided with pull rods, tappet plates and specially constructed followers for reversing the valve motion.

Other objects and advantages of the invention will become apparent from the drawings and following specification, in which, like or corresponding numbers designate the same or similar parts through out the several views and in which.

Figures 1, 2:
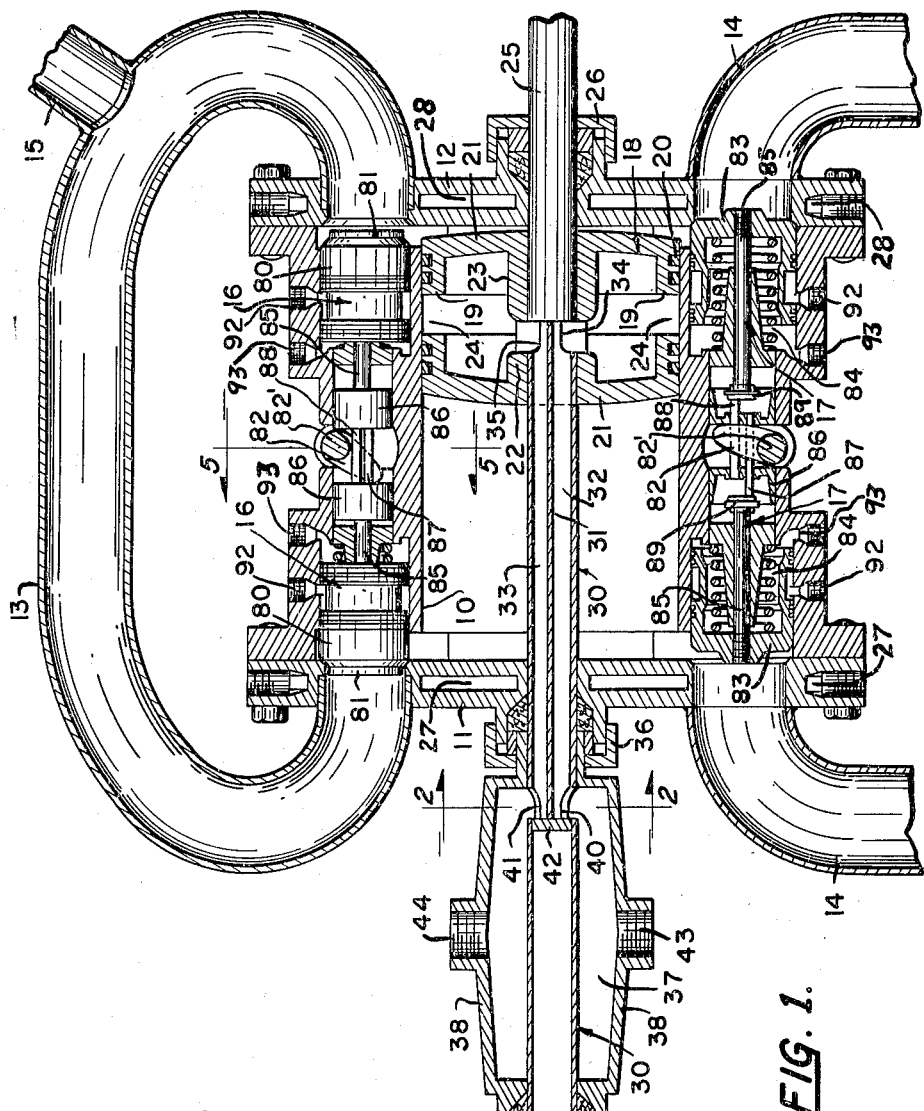
FIG. 1 is a longitudinal sectional view of a "Superheat Engine" or hot gas engine embodying my invention. A superheat engine is a piston engine using highly superheated steam and, or, other very hot gases.
FIG. 2 is a cross-section of FIG. 1 on the section line 2—2 showing details of the circulating means for the piston.

Referring to FIG. 1 the numeral 10 indicates the cylinder, which is closed at the ends by the cylinder heads 11 and 12. Highly heated gases and, or, highly superheated steam enters the intake manifold 13 through the inlet 15. The exhaust outlets 14 are located on the opposite side of the cylinder 10. In order to maintain the working parts of the engine at a reasonable temperature an extensive circulating system is provided. A cooling agent or a cooling, sealing and lubricating agent is sent around the piston portion 16 of the intake piston poppet-valves 80 and the exhaust piston poppet-valves 83. Inlets for the circulating agent are designated by numerals 92 but the outlets, which are along one side of the engine, cannot be seen in FIG. 1. Inlets 93 are provided into the four spring chambers 84, shown in detail on the exhaust side of the engine, for a gas or fluid to enter under pressure to assist the springs in holding the valves 80 and 83 in closed position. This is an absolutely necessary provision for high speed and high pressure engines. The cylinder heads 11 and 12 are thoroughly provided with jackets 27 and 28 for a cooling agent as shown and claimed in my Patent No. 2,464,112.

The double acting piston 21 is provided with rings 20 in the portions 19 on each side of the annular opening 24. The usual piston rod 25 passes through the packing gland 26 and cylinder head 12 and is securely mounted in the hub 23 of the piston 21. The opposite hub 22 of the piston 21 has a tube 30 securely mounted in it. The tube 30 is divided into two passage ways 32 and 33 by the partition 31. The passage way 32 is open into the lower part of the piston 21 through a hole 34 in the hub portions 22 and 23 while a hole 35 is open on the top side to the interior of the piston 21.

The tube 30 continues out of the cylinder 10 through the head 11 and packing gland 36, through the circulating distribution chamber 38 and then through the packing gland 39 at the far end. The circulating agent, evaporating at constant temperature, enters the lower portion 37 of the chamber 38 ond then through a hole 40 to the passageway 32 of the tube 30. It continues through the passageway 32 to the hole 34 and enters the lower inside of the piston 21. After the circulating agent contacts the inside of the piston 21 it leaves through the hole 35 and outlet passageway 33 in the tube 30 and on out through the hole 41 into the top opening in the chamber 38 and then it leaves through the outlet 44. A partition 42 prevents the fluid from running out the open end of the tube 30. A circulating agent evaporating at constant temperature must be sent thru the rod 30 and piston 21 to avoid uneven expansion. This feature of evaporative cooling is explained and claimed in a separate patent application for Fluid Cooled Pistons for High Temperature Engines, Serial No. 27,020 filed May 5, 1960.

The FIG. 2, on the section line 2—2 of FIG. 1, shows in cross-section the chamber 38 and tube 30. Also can be seen, the lower opening 37 in the chamber 38, the inlet 40 into the lower passageway 32 of the rod 30, the partition 31 and the upper passageway 33, which is in communication with the hole 41 into the top opening in the chamber 38. This concludes the description of the circulating system, as applied to this design of superheat engine.

Figure 3:
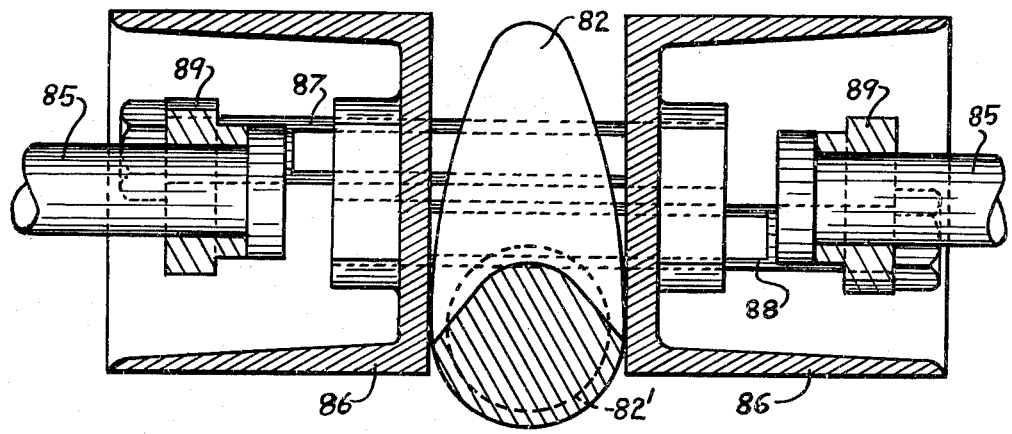
FIG. 3 is a greatly enlarged longitudinal sectional view of the cam, followers and pull rods shown in FIG. 1.

The greatly enlarged view, FIG. 3, shows in detail, the means of pulling the valves 80 and 83 of FIG. 1 away from their seats. The cam 82 is mounted on its shaft 82', shown in dotted lines. When the cam 82 oscillates to the left it moves the left follower toward the left, which is connected by two pull rods 88, only one rod being shown, going to the right tappet plate 89 which, in turn, pulls the right valve rod 85 toward the left. The pull rods 88 are securely mounted in the left follower 86 and slidably mounted in the right follower 86. When the cam 82, oscillates to the right, the right hand follower 86 moves to the right and imparts its motion through two pull rods 87, only one rod being shown, going to the left tappet plate 89 where the motion is imparted into the left valve rod 85 which, in turn, is pulled toward the right. The pull rods 87 are securely mounted in the right hand follower 86 and slidably mounted in the left hand follower 86. The numeral 17 on the exhaust side of FIG. 1, designates the valve rod guides through which the valve rods 85 travel back and forth.

Figure 4:
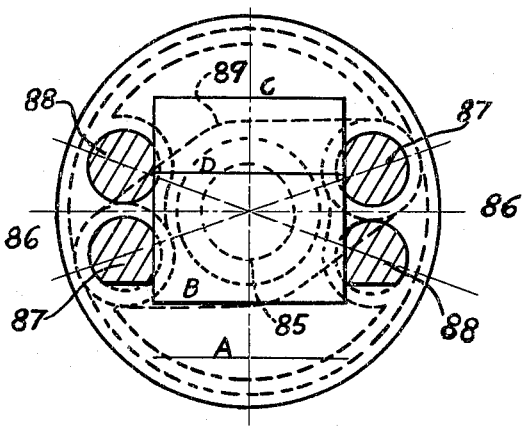
FIG. 4 is a greatly enlarged view of the face of the followers shown in FIG. 1.

FIG. 4 is a face view of the left hand follower 86 of FIG. 3. It can be seen in FIG. 4 how the two sets of pull rods 87 and 88 are mounted on opposite sides of the exact center of the follower 86 and valve rod 85, which is shown in dotted lines. The tappet plate 89, mounted on pull rods 87 and having the valve rod 85 mounted therein, can also be seen in dotted lines. The cam 82, which fits between the pull rods 87 and 88 is not shown, but its pattern of contact with the follower 86 is designated by the letters A, B, C and D. The center line of oscillation of the cam 82 is at A, while the actual valve contact takes place at B, when the proper tappet clearance is allowed. The cam 82 sweeps the face of the follower 86 from B to C, accelerating the valves 80 and 83 of FIG. 1 to maximum velocity at C. The cam 82 continues on to its position of maximum oscillation at D, where the valves come to rest at their full open positions. The cam 82 then returns to its mid-position, in reverse order, as originally shown in FIG. 3. This same explanation holds for the right hand follower 86 and pull rods 88. The amount the cam 82 oscillates, determines the amount the valves 80 and 83 of FIG. 1 are opened. Thus, a variable-eccentric or other conventional valve actuating means can adjust the amount of intake opening to give the proper cut-off of the gases entering the cylinder 10 of FIG. 1 from the intake manifold 13, to meet the power requirements. A cut-off skirt 81, which gives a quick cut-off, can be provided on the out ends of the intake valves 80 so the actual port opening does not occur until the cam 82 has accelerated the valves 80 to the contact point C on the follower 86 of FIG. 4, which is the point of maximum velocity of the valves 80. My Patent No. 2,641,438 illustrates and claims poppet-valves provided with this feature of construction.

On the other side of the engine cylinder of FIG. 1 the exhaust valves 83 have no cut-off skirt 81, so a very large exhaust opening can be had. The right intake valve 80 and the left exhaust valve 83 are shown in partly open positions in FIG. 1. The valves 83 can be opened from the same eccentric, or valve actuating means, as the opposite intake valves 80 or they can be independently opened by a separate eccentric or valve actuating means. When independently actuated, the valves 83 can be adjusted to give the best possible exhaust duration at all times.

Figure 5:
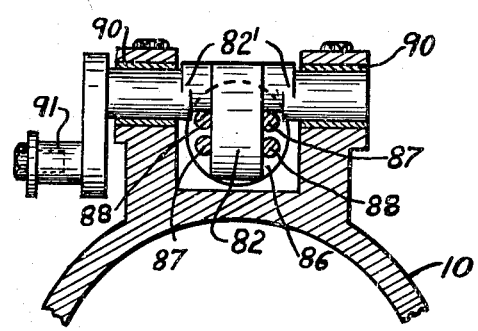
FIG. 5 is a cross-sectional view on the section line 5—5 of FIG. 1 showing the cam shaft and bearings.

FIG. 5, taken on the section line 5—5 of FIG. 1, shows the cam 82 and cam shaft 82' mounted cross-way on the cylinder 10 and supported by the bearings 90. Plain bearings 90 are shown but anti-friction bearings of the ball or roller type can be mounted on the ends of the shaft 82'. A driving arm and pin 91 is provided on one end of the shaft 82' to receive motion from an eccentric, or other valve actuating means. The cam 82 is mounted between the two sets of pull rods 87 and 88 and contacts the follower 86. In this design the cam shaft 82' is off-set to give more room for the pull rods 87 and 88. The rods 87 and 88 have flat surfaces next to the cam 82 and next to the off-set portion of the cam shaft 82'. These flat surfaces, which serve as bearing surfaces, are shown in FIGS. 3 and 4 also. In FIG. 3 the pull rod 88 would interfere with the off-set portion of the shaft 82' as can be seen, but by machining that side of the rod flat, as is shown by the dotted line just above, it will then clear the off-set portion of the shaft 82'. The object of this rather complicated design is to build the mechanism as compact as possible and yet have plenty of material in the parts to give great strength. If necessary, the pull rods 87 and 88 can be made of a special type of steel, having the great strength of 263,000 pounds per square inch of cross-section. Still stronger materials may soon be financially practical.

Figure 6:
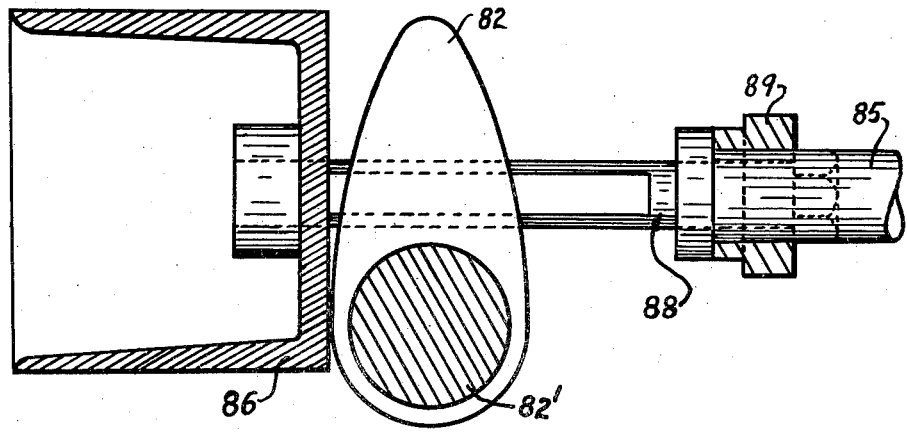
FIG. 6 is an enlarged sectional view of a cam and one follower joined to a tappet plate by a set of pull rods.

FIG. 6 shows a cam 82 and its shaft 82'. Only one follower 86 is used and it is joined by two pull rods 88 to the tappet plate 89, which in turn is mounted on the valve rod 85. One rod 88 shows.

Figure 7:
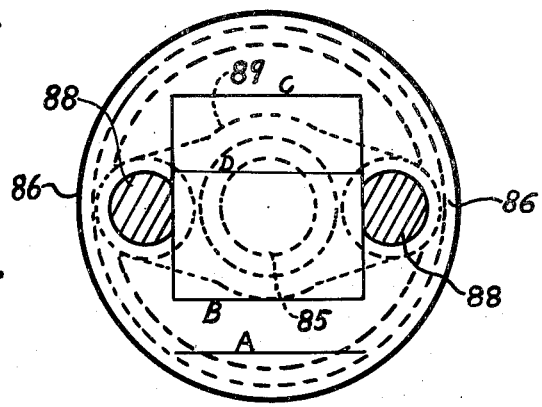
FIG. 7 is a face view of the follower of FIG. 6 and has a dotted pattern of the tappet plate and valve rod, shown to the right of the cam in FIG. 6.
Figure 8:
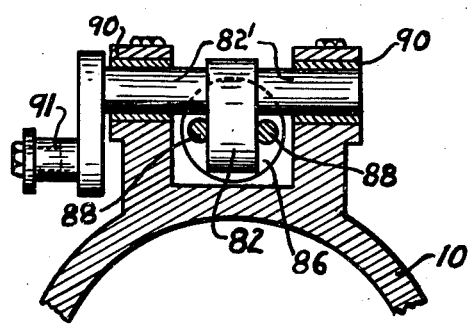
FIG. 8 is a sectional view of the assembly of FIGS. 6 and 7 as mounted on an engine cylinder as on the section line 5—5 of FIG. 1. The assembly may be used on this design of engine or it can be used on other types of engines also.

FIG. 7 is a face view of the follower 86 of FIG. 6 and shows the two pull rods 88 mounted securely in its face. Behind the follower 86 in dotted lines, is superimposed a pattern of the tappet plate 89 and valve rod 85, shown to the right of the cam 82 of FIG. 6. The rods have flat surfaces adjacent the sides of the cam 82 as is shown in FIG. 6 also. The letters A, B, C and D are the same as for FIG. 4. FIG. 8 shows the very simple construction of FIGS. 6 and 7 as mounted on the cylinder 10 of FIG. 1, as on the section line 5—5. This simplified construction is intended for use with single acting engines in which the steam or hot gases are admitted to one end of the cylinder only.

The advantages of this valve actuating mechanism are three fold. The valves 80 and 83 are pulled back, or away, out of the intake and outlet ports at the end of the cylinder 10. This gives a very direct passage way into and out of the cylinder 10. The hot gases do not flow around the head of the valve as is common practice in internal combustion engines and in most poppet-valve steam engines. The piston poppet valves 80 and 83 here shown, can be efficiently cooled by passing a circulating agent around the valve in the passage way 16. Last, this type of valve actuating means will give any desired type and length of valve opening.

From the description of the means for pulling valves open it will be seen, a simple oscillating cam can actuate either one or two valves. The followers and cam are at the center of the cylinder and at the greatest distance away from the incoming and out going hot gases or highly superheated steam, which prevents overheating them.

Changes may be made in the details of construction and in the form and arrangement of the several parts without departing from the scope of the invention as defined by the appended claims.

I claim:

1. In an oscillating cam and follower assembly for reversing the motion used to actuate valves, an oscillating cam mounted on a shaft parallel with the face of the follower and so located that said cam is always in contact with the face of said follower, said follower having parallel pull rods securely mounted in the face of said followers and at right angles to the surface of the face, said pull rods extending past the sides of said cam to a point beyond the cam, at said point beyond said cam the parallel pull rods are joined by a cross-member in which said pull rods are mounted, a valve having a valve rod, the center of said cross-member, in turn, being mounted on said valve rod, said valve rod, cross-member and parallel pull rods all moving together with and in the direction of said follower on the opposite side of said cam so said valve rod pulls the valve away from a seated or closed position and the amount of valve opening and the length of time the valve is open being determined by the amount said cam oscillates.

2. In an oscillating cam and follower assembly for reversing the motion used to actuate valves, an oscillating cam mounted on a shaft parallel with the face of the follower and so located that said cam is always in contact with the face of said follower, said follower having parallel pull rods securely mounted in the face of said followers and at right angles to the surface of the face and provided with flat surfaces along the sides of said rods adjacent the side surfaces of said cam and serving as a bearing surface against the side of said cam, said pull rods extending past the sides of said cam to a point beyond the cam, at said point beyond said cam the parallel pull rods are joined by a cross-member in which said rods are mounted, a valve having a valve rod, the center of said cross-member surrounding said valve rod and mounted thereon, said valve rod, cross-member and parallel pull rods all moving together with and in the direction of said follower on the opposite side of said cam so said valve rod pulls the valve away from a seated or closed position and the amount of valve opening and the length of time the valve is open being determined by the amount said cam oscillates.

3. In an oscillating cam and follower assembly for reversing the motion used to actuate valves, an oscillating cam mounted between two followers on a shaft parallel with the face of the two followers and so located that said cam is always in contact with the surface of said followers, said followers having parallel pull rods securely mounted in their face at right angles to the surface of their face, said pull rods securely mounted in the first follower passing the sides of said cam and through slidably arranged openings in the second follower to a point beyond the second follower, at said joint beyond said second follower said parallel pull rods are joined by a cross-member in which said rods are mounted, a first valve having a valve rod, said pull rods securely mounted in said second follower passing the sides of said cam and through slidably arranged openings in said first follower to a point beyond the first follower, at said point beyond said first follower said parallel pull rods are joined by a cross-member in which said rods are mounted, a second valve having a valve rod, the center of each of said cross-members surrounding each said valve rod and mounted thereon, said valve rod, cross-member and pull rods securely mounted in said first follower all moving together with and in the direction of said first follower on the opposite side of said cam so the first valve rod pulls a valve away from a seated or closed position and said valve rod, cross-member and pulls rods securely mounted in said second follower all moving together with and in the direction of said second follower on the opposite side of said cam so the second valve rod pulls a valve away from a seated or closed position and the amount the valves open and the length of time the valves are open being determined by the amount said cam oscillates.

4. In an oscillating cam and follower assembly for reversing the motion used to actuate valves, an oscillating cam mounted between two followers on a shaft parallel with the face of the two followers and so located that the cam is always in contact with the surface of said followers, said followers having parallel pull rods mounted securely in their face at right angles to the surface of their face, said pull rods securely mounted in the first follower passing the sides of said cam and through slidably arranged openings in the second follower to a point beyond the second follower, at said point beyond said second follower said parallel pull rods are joined by a cross-member in which said rods are mounted, a first valve having a valve rod, said pull rods securely mounted in said second follower passing the sides of said cam and through slidably arranged openings in said first follower to a point beyond the first follower, at said point beyond said first follower said parallel pull rods are joined by a cross-member in which said rods are mounted, a second valve having a valve rod, the center of each of said cross members surrounding each said valve rod and mounted thereon, said valve rod, cross-member and pull rods securely mounted in said first follower all moving together with and in the direction of said first follower on the opposite side of said cam so the first valve rod pulls a valve away from a seated or closed position and said valve rod, cross-member and pull rods securely mounted in said second follower all moving together with and in the direction of said second follower on the opposite side of said cam so the second valve rod pulls a valve away from a seated or closed position, all of said parallel pull rods provided with flat surfaces along their sides adjacent the sides of said cam, serving as a bearing surface against the side surfaces of said cam and the amount the valves open and the length of time the valves are open being determined by the amount said cam oscillates.

5. In a cam and follower assembly for actuating valves in reverse order, an oscillating cam mounted between two followers on a shaft parallel with the face of the two followers and so located that the cam is always in contact with the face of the two followers, said followers having parallel pull rods mounted securely in their face at right angles ot the surface of their face, said pull rods securely mounted in the first follower passing the sides of said cam and through slidably arranged openings in the second follower to a point beyond the second follower, at said point beyond said second follower said parallel pull rods are joined by a cross member in which said rods are mounted, a first valve having a valve rod, said pull rods securely mounted in said second follower passing the sides of said cam and through slidably arranged openings in said first follower to a point beyond the first follower, at said point beyond said first follower said parallel pull rods are joined by a cross-member in which said rods are mounted, a second valve having a valve rod, the center of each of said cross-members surrounding each said valve rod and mounted thereon, said valve rod, cross-member and pull rods securely mounted in said first follower all moving together with and in the direction of said first follower on the opposite side of said cam so the first valve rod pulls a valve away from a seated or closed position and said valve rod, cross-member and pull rods securely mounted in said second follower all moving together with and in the direction of said second follower on the opposite side of said cam so the second valve rod pulls a valve away from a seated or closed position, all of said parallel pull rods provided with flat surfaces along their sides adjacent the sides of said cam, serving as a bearing surface against the side surfaces of said cam, and the surfaces of said parallel pull rods crossing at right angles and adjacent the surface of said cam shaft provided with flat surfaces also and the amount the valves open and the length of time the valves are open being determined by the amount said cam oscillates.

6. In a cam and follower assembly for actuating valves in reverse order, an oscillating cam mounted between two followers on a shaft parallel with the face of the two followers and so located that the cam is always in contact with the surface of said followers, said followers having parallel pull rods securely mounted in their face at right angles to the surface of their face, said pull rods securely mounted in the first follower passing the sides of said cam and through slidably arranged openings in the second follower to a point beyond the second follower, at said point beyond said second follower said parallel pull rods are joined by a cross-member in which said rods are mounted, a first valve having a valve rod, said pull rods securely mounted in said second follower passing the sides of said cam and through slidably arranged openings in said first follower to a point beyond the first follower, at said point beyond said first follower said parallel pull rods are joined by a cross-member in which said rods are mounted, a second valve having a valve rod, the center of each of said cross-members surrounding each said valve rod and mounted thereon, said valve rod, cross-members and pull rods securely mounted in said first follower all moving together with and in the direction of said first follower on the opposite side of said cam so the first valve rod pulls a valve away from a seated or closed position and said valve rod, cross-member and pull rods securely mounted in said second follower all moving together with and in the direction of said second follower on the opposite side of said cam so the second valve rod pulls a valve away from a seated or closed position, all of said parallel pull rods provided with flat surfaces along their sides adjacent the sides of said cam, serving as bearing surfaces against the side surfaces of said cam, and the surfaces of said parallel pull rods crossing at right angles and adjacent the surface of said cam shaft provided with flat surfaces also and the cam shaft off-set at the locations where said parallel pull rods cross adjacent said cam shaft, and the amount said valves open and the length of time the said valves are open being determined by the amount said cam oscillates.

References Cited in the file of this patent

UNITED STATES PATENTS

| | | |
|---|---|---|
| 1,872,180 | Peterson | Aug. 16, 1932 |
| 2,464,112 | Arnold | Mar. 8, 1949 |